Aug. 17, 1965     L. R. JOHNSON     3,200,885
METHOD OF MAKING HORSESHOE WITH RUBBER-CUSHIONED SOLE
Filed Dec. 19, 1962     2 Sheets-Sheet 1
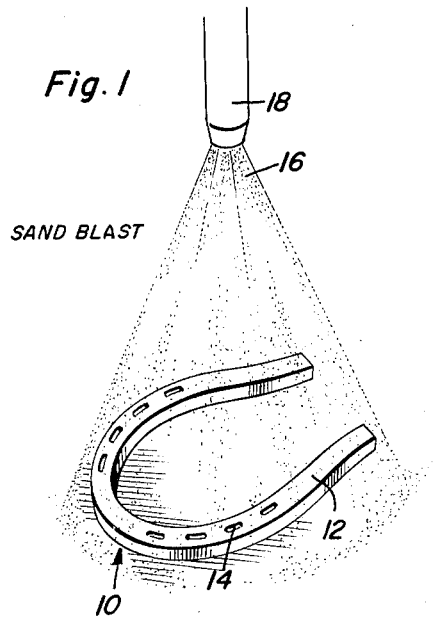
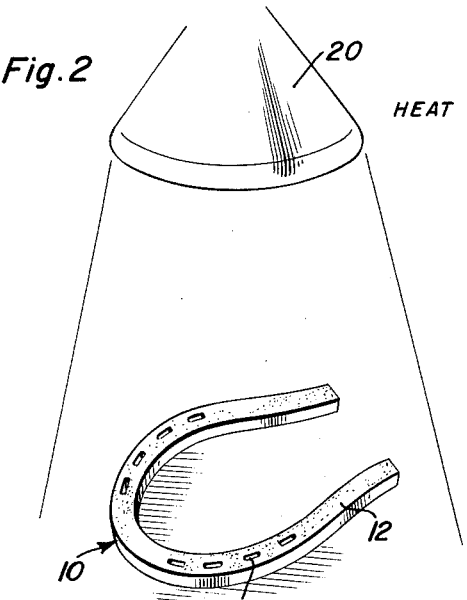
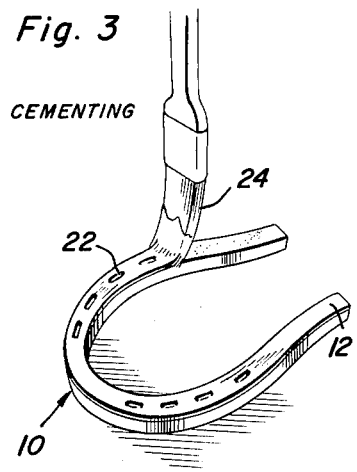
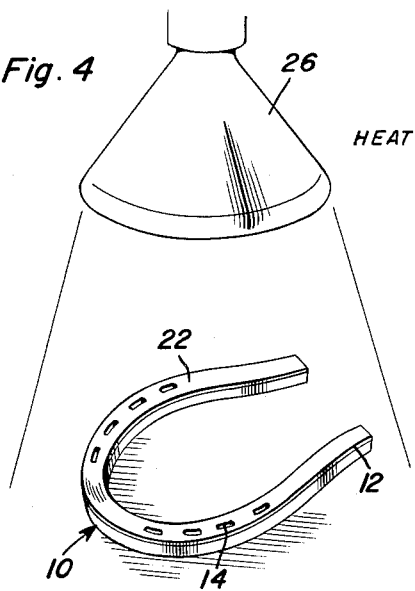
Luther R. Johnson
INVENTOR.

Aug. 17, 1965  L. R. JOHNSON  3,200,885
METHOD OF MAKING HORSESHOE WITH RUBBER-CUSHIONED SOLE
Filed Dec. 19, 1962  2 Sheets-Sheet 2
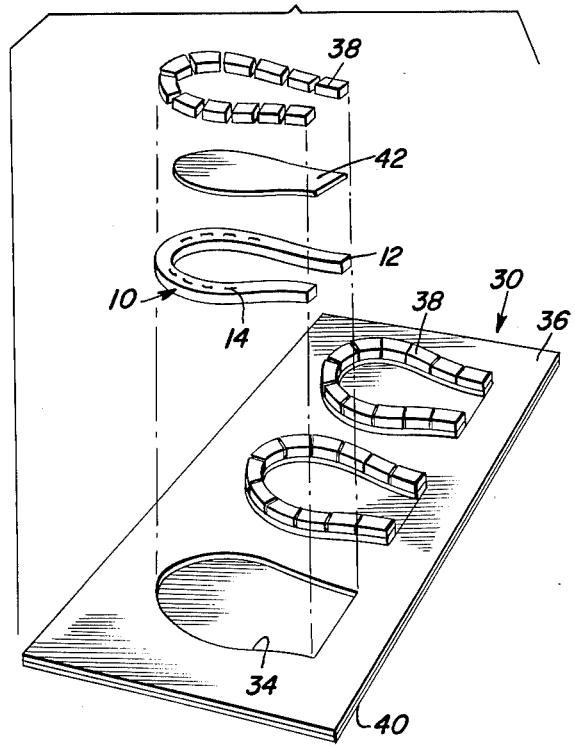
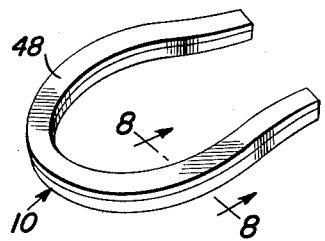
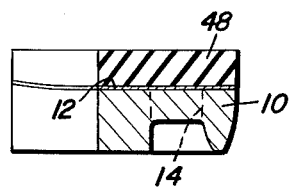
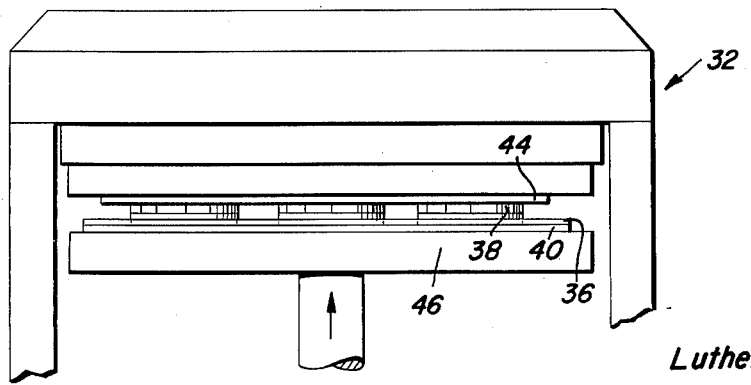
Luther R. Johnson
INVENTOR.

3,200,885
METHOD OF MAKING HORSESHOE WITH
RUBBER-CUSHIONED SOLE
Luther R. Johnson, Taylor, Tex.; Berniece Kuempel Johnson, executrix of said Luther R. Johnson, deceased
Filed Dec. 19, 1962, Ser. No. 245,748
1 Claim. (Cl. 168—12)

The present invention generally relates to horseshoes having a rubber cushion bonded or adhered thereto for engaging the hoof of the horse together with a novel of producing such a horseshoe.

An object of the present invention is to provide a horseshoe having a cushion bonded to the hoof engaging surface thereof by the employment of a novel heat and pressure process employing blocks of cushioning material with the cushioning material being neoprene.

Another object of the present invention is to provide a horseshoe with a neoprene cushion thereon which due to the novel process becomes actually a unitary structure with the neoprene securely bonded in place.

The horseshoe is preferably constructed in the nature of existing type steel horseshoes or it may be constructed of lighter metal including a conventional shoe, a racing shoe, a polo shoe or any other type of horseshoe. The particular type of horseshoe may vary and still incorporate the inventive concept of the present invention by the addition of a neoprene cushion thereon by employing the novel process of making the horseshoe with the cushion thereon.

Another object of the present invention is to provide a horseshoe having novel structural features that is constructed by a novel process for making the same with both the horseshoe and process being relatively simple, easy to practice, relatively inexpensive and effective for its particular purpose of producing a horseshoe with a cushion sole of neoprene.

These together with the objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the initial step in the process of the present invention;

FIGURE 2 is a perspective view illustrating a subsequent step;

FIGURE 3 is a perspective view illustrating the step of applying a bonding cement to the surface of the horseshoe;

FIGURE 4 is a perspective view illustrating another step in the process;

FIGURE 5 is a group perspective view illustrating the mold plate employed with the present invention;

FIGURE 6 is a side elevational view illustrating the mold plate employed in a suitable heat and pressure applying press;

FIGURE 7 is a perspective view of the completed horseshoe with the cushioned sole thereon; and FIGURE 8 is a transverse, sectional view taken substantially upon a plane passing along section line 8—8 of FIGURE 7.

Referring now specifically to the drawings, FIGURE 1 illustrates a conventional horseshoe 10 having a flat surface 12 which normally engages the hoof of the horse. Apertures 14 are provided for receiving the usual securing nails. The horseshoe 10 is of conventional construction and may be of any suitable type including a regular steel horseshoe or other lighter weight metal horseshoes such as employed as racing shoes, polo shoes and the like. The first step after obtaining the conventional horseshoe is to clean the flat surface thereof by sandblasting with the sandblasting material being designated by the numeral 16 and being discharged from a suitable sandblasting nozzle 18 of any suitable configuration and construction. The sandblasting operation removes all foreign material including any rough or oxidized metal on the flat surface. The horseshoe 10 is then cleaned with a suitable cleaning material such as carbon tetrachloride. After the horseshoe has been cleaned with the cleaning agent, it is placed under a heat lamp 20 or other suitable sources of ray light in order that all moisture be removed from the flat surface 12 of the horseshoe. Thus, after this procedure, the horseshoe is completely clean and completely dry.

Cement 22 is then applied to the flat surface 12 of the clean horseshoe 10 by suitable structure such as a brush 24 or the like. The cement is applied only to the flat surface and may be that type known as TY Ply-S which is a black, non-tack adhesive used for bonding neoprene leather to metal during vulcanization. The horseshoe 10 with the cement 22 applied to the flat surface 12 thereof is then placed back under a heat lamp or other ray light 26 for a period of approximately one hour so that the cement becomes quite tacky.

A mold assembly generally designated by numeral 30 is placed in a heat and pressure applying press 32 and is preheated to approximately 300 degrees F. and the mold 30 is then taken out of the press and placed on a workbench. The shoe 10 is placed in an opening 34 in a flat rectangular mold plate 36. The flat surface of the shoe 10 is facing upwardly and a plurality of neoprene blocks 38 are placed on the flat surface of the shoe with the neoprene blocks 38 being slightly spaced from each other and preferably being of dimensions of the order of ½ inch by ⅜ inch. Underlying the mold plate 36 which may preferably be 16 inches by 18 inches and of 16 gauge sheet material is a plate or sheet 40 of the same size and also of the same material. A filler block or plate 42 is disposed in the interior of the horseshoe 10 and the neoprene blocks preferably one inch in length are placed on the tacky surface of the shoe in slightly spaced relation and a metal sheet 44 is placed on top of the neoprene blocks and the entire assembly is then placed back into the heated press 32 and a temperature of approximately 300 degrees F. is attained and a pressure of approximately 150 tons is applied to the mold assembly 30 by a pressure plate 46. The temperature and pressure conditions should be maintained for exactly twenty-three minutes in order to avoid undercooking or overcooking and the assembly is then removed from the heated press and while the shoe is still warm, the excess neoprene may be removed therefrom by saws and sanding. The chlorobutadiene polymer (neoprene) blocks 38 utilized are capable of being vlucanized under the influence of the temperature-pressure-time conditions set forth above to form the cushioning role 48. The ability of chlorobutadiene polymers to flow together in such a manner is well known. A reference to this property is contained on page 94 of "A Manual of Plastics and Resins" by Schack published by the Chemical Publishing Company, Inc. wherein it is stated in part "vulcanizates of properly compounded neoprene polymers have excellent resistance to attack by sunlight, heat oxygen and ozone."

It is pointed out that no special provisions are made in the horseshoe for receiving the neoprene with the neoprene being bonded to the flat surface thereof. This assembly also produces a horseshoe with the neoprene bonded thereto which will stand up under extremely rough use which, of course, is inevitable when the shoe is placed on the hoof of the horse.

The final structure of the horseshoe 10 is illustrated in FIGURE 7 in which the cushioning sole is designated by numeral 48 and FIGURE 8 illustrates the orientation of the cushioning sole to the metallic horseshoe. The high pressure employed in the press as well as the temperature both are absolutely necessary in order to effectively bond the neoprene to the flat surface of the horseshoe. The blocks of neoprene are used in view of the fact that the horseshoe has a contour making it substantially impossible to adhere or bond strips or solid layers of neoprene thereto. An open face die or mold plate is used thus necessitating the top and bottom plates which enable ready removal of the shoe from the die after the neoprene has been cooked.

The foregoing is considered as illustrative only of the principles of the invention. Further, since numerous modifications and changes will readily occur to those skilled in the art, it is not desired to limit the invention to the exact construction and operation shown and discribed, and accordingly all suitable modifications and equivalents may be resorted to, falling within the scope of the invention as claimed.

What is claimed as new is as follows:

The process of making a cushioned horseshoe consisting of the steps of applying cement to the flat hoof engaging surface of the horseshoe, allowing the cement to partially dry, applying a plurality of blocks of deformable resilient material onto the partially dried cemented surface with the blocks orientated in spaced relation, applying a pressure of 150 tons per square inch for a period of 23 minutes at a temperature of 300 degrees Fahrenheit to the blocks of material to bond the blocks to the substantially flat surface and to each other to form a unitary continuous cushion from the plurality of blocks.

References Cited by the Examiner

UNITED STATES PATENTS

| 546,145 | 9/95 | Gibbs | 168—12 |
| 674,655 | 5/01 | Patrick | 168—14 |
| 1,163,938 | 12/15 | Matchett | 168—12 |
| 2,637,404 | 5/53 | Bart | 161—221 |
| 2,705,536 | 4/55 | Phreaner | 168—14 |
| 2,801,948 | 8/57 | Walker | 156—306 |
| 2,866,731 | 12/58 | Van Epp | 161—221 |
| 2,933,428 | 4/60 | Mueller | 156—306 |

OTHER REFERENCES

Modern Synthetic Rubbers 3rd. Ed. Chapman S. Hall Lt'd, London, England, TS 1925–B3–1949, page 444.

SAMUEL KOREN, *Primary Examiner.*
ALDRICH F. MEDBERY, *Examiner.*